United States Patent
Shimada (10) Patent No.: US 11,165,370 B2
(45) Date of Patent: Nov. 2, 2021

(54) VIBRATION ACTUATOR

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 15/945,508

(22) Filed: Apr. 4, 2018

(65) Prior Publication Data
US 2018/0316286 A1 Nov. 1, 2018

(30) Foreign Application Priority Data

Apr. 26, 2017 (JP) .............................. JP2017-087516

(51) Int. Cl.
*H02N 2/10* (2006.01)
*H02N 2/00* (2006.01)
*G02B 7/04* (2021.01)

(52) U.S. Cl.
CPC .......... *H02N 2/103* (2013.01); *H02N 2/0065* (2013.01); *H02N 2/106* (2013.01); *G02B 7/04* (2013.01)

(58) Field of Classification Search
CPC .......... H02N 2/103; H02N 2/12; H02N 2/123; G02B 7/04
See application file for complete search history.

(56) References Cited

U.S. PATENT DOCUMENTS

| 5,973,439 | A | * | 10/1999 | Nishio | H02N 2/123 |
| | | | | | 310/323.12 |
| 9,154,056 | B2 | | 10/2015 | Kei et al. | |
| 2006/0220496 | A1 | * | 10/2006 | Fujimoto | H02N 2/163 |
| | | | | | 310/323.13 |
| 2010/0321806 | A1 | * | 12/2010 | Mori | G02B 7/08 |
| | | | | | 359/824 |
| 2011/0273058 | A1 | * | 11/2011 | Suefuji | H02N 2/0065 |
| | | | | | 310/323.02 |

(Continued)

FOREIGN PATENT DOCUMENTS

| JP | 05-211783 A | 8/1993 |
| JP | 2003-224987 A | 8/2003 |
| JP | 2010-263769 A | 11/2010 |

(Continued)

*Primary Examiner* — Bryan P Gordon
(74) *Attorney, Agent, or Firm* — Canon U.S.A., Inc. I.P. Division (57) ABSTRACT

A vibration actuator includes an electro-mechanical transducer, a vibrating body fixed to the electro-mechanical transducer, the vibrating body being vibrated by applying a voltage to the electro-mechanical transducer, and a driven body contacting the vibrating body. The driven body is frictionally driven by a vibration of the vibrating body. The driven body includes a first extended portion extending from a main body portion of the driven body towards an inside diameter side of the vibrating body, a second extended portion extending from the first extended portion towards the outside diameter side of the vibrating body, and a contact surface provided at a tip of the second extended portion. The contact surface contacts the vibrating body. The first extended portion, the second extended portion, and the contact surface are each capable of elastically deforming in a rotational axis direction of the driven body.

11 Claims, 6 Drawing Sheets

(56) References Cited

U.S. PATENT DOCUMENTS

2012/0274181 A1* 11/2012 Araki .................... H02N 2/103
  310/323.16
2015/0015121 A1* 1/2015 Watanabe ............. H01L 41/083
  310/365

FOREIGN PATENT DOCUMENTS

| JP | 2012139080 A | 7/2012 |
| JP | 2016013009 A | 1/2016 |

* cited by examiner

OUTER DIAMETER SIDE

FIG. 7C
PRIOR ART

VIBRATION ACTUATOR

BACKGROUND OF THE INVENTION

Field of the Invention

The present disclosure relates to a vibration actuator.

Description of the Related Art

Figure 7A:
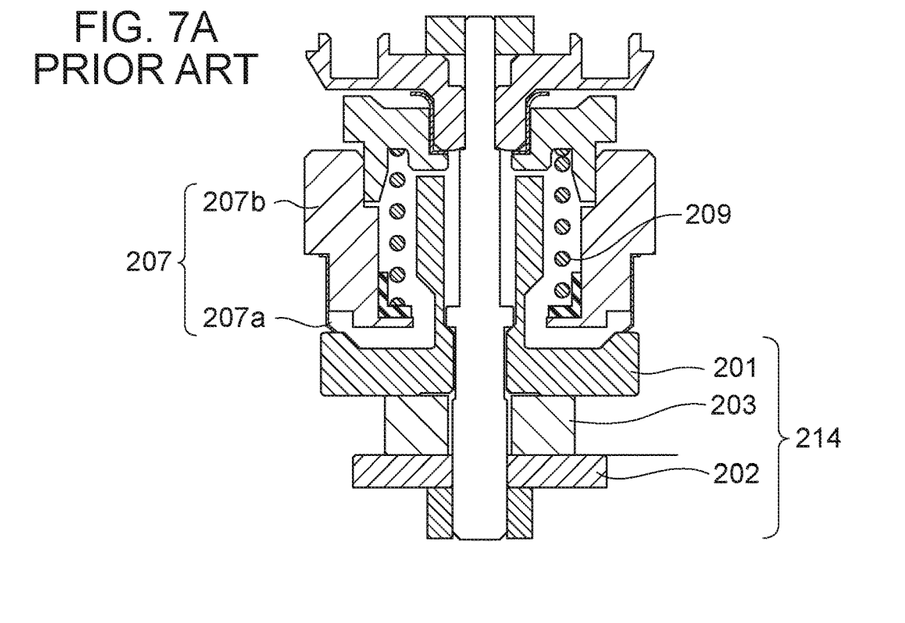
FIG. 7A is a schematic cross-sectional view of a known vibration actuator according to an example of a related art.
Figure 7B:
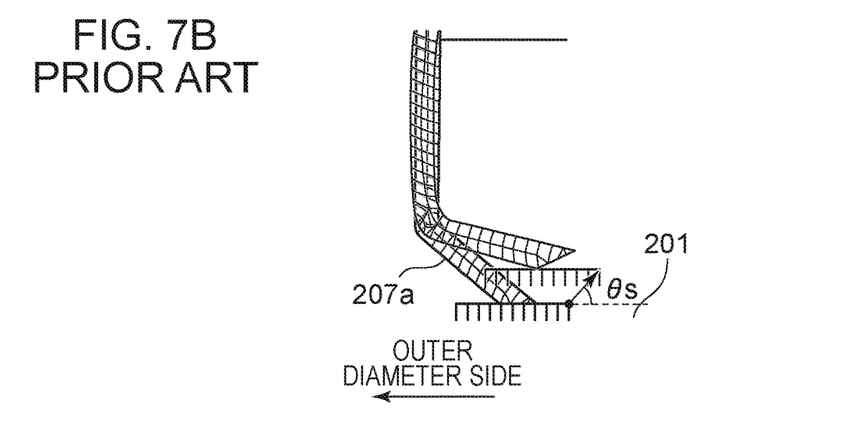
FIG. 7B is a schematic diagram illustrating a displacement of a contact surface of a known movable body according to the example of the related art.
Figure 7C:
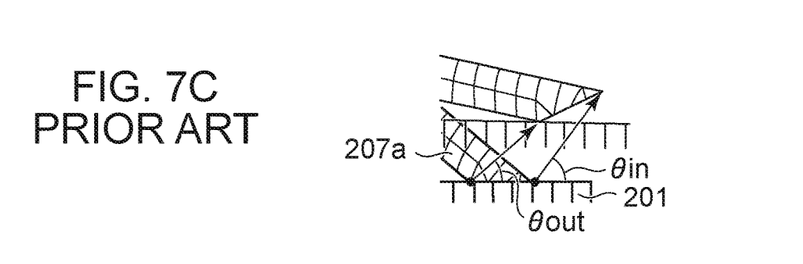
FIG. 7C is an enlarged view illustrating the displacement of the contact surface of the known movable body according to the example of the related art.

Vibration actuators are applied as products that drive camera lenses and the like. A rod-shaped vibration actuator is described in Japanese Patent Laid-Open No. 2016-13009. FIGS. 7A to 7C are schematic diagrams illustrating a configuration of a known rod-shaped vibration actuator described in Japanese Patent Laid-Open No. 2016-13009. Typically, a rod-shaped vibration actuator includes a vibrating body, in which a driving vibration is formed, as the main component. The vibrating body and a rotor, to which pressure is applied and which is in contact with the vibrating body, are relatively moved by the vibration generated by the vibrating body.

A vibrating body 214 includes at least two elastic members 201 and 202, and a piezoelectric element 203 that is pinched between the elastic members 201 and 202. In order to generate a vibration in an efficient manner, the piezoelectric element 203 is tightened so that a predetermined pinching force is applied thereto. Furthermore, by applying an electric field to the piezoelectric element 203 and exciting two bending vibrations that are orthogonal to each other in the vibrating body 214, an ellipsoidal movement is created on the elastic member 201. A rotor 207 is made to be in pressure contact with the elastic member 201 so that driving force created by fuctional force is obtained. The rotor 207 includes a contact portion 207a and a rotor main ring 207b. By applying pressure to the rotor 207 with a pressure spring 209, the rotor 207 and the vibrating body 214 come in pressure contact with each other.

A contact surface of the elastic member 201 that comes in contact with the contact portion 207a of the rotor 207 is displaced in an arrow direction θs in FIG. 7B with the vibration formed in the vibrating body 214. The contact portion 207a of the rotor 207 is configured to become displaced in a direction that substantially coincides the displacement direction of the contact surface of the elastic member 201. However, since the displacement direction on the outside diameter side of the contact portion 207a and the displacement direction on the inside diameter side of the contact portion 207a are different, if, for example, the displacement direction of the contact portion 207a on the outside diameter side is matched to the displacement direction of the contact surface of the elastic member 201, there will be cases in which the displacement direction on the inside diameter side becomes deviated and, as illustrated in FIG. 7C, the inside diameter side becomes lifted up. As a result, surface pressure concentrates on the outside diameter side of the contact portion 207a, causing the wear to proceed and friction loss to become large.

Conversely, in U.S. Pat. No. 9,154,056, the shape of the contact portion of the rotor has been devised so that the displacement direction of the entire surface of the contact surface in contact with the elastic member of the contact portion of the rotor substantially coincides with the displacement direction of the contact surface of the elastic member.

If the rotor described in U.S. Pat. No. 9,154,056 is, for example, manufactured by press working, the limit of the flatness of the contact surface of the contact portion will be about 0.03 mm. However, for example, in a case in which the rotor diameter is about φ10, a sufficient drive efficiency cannot be obtained unless the flatness of the contact surface is in the order of submicrons, and taking the spring property of the contact surface into consideration, the appropriate value of the plate thickness of the contact portion will be around 0.05 mm. Accordingly, if a contact surface having a finished flatness of 0.03 mm is grinded or lapped to the desired flatness, the contact surface becomes thin and the desired spring property and the displacement direction may not be obtained. Furthermore, the contact surface may become eliminated due to wear.

SUMMARY OF THE INVENTION

In view of the issues described above, the present disclosure provides a vibration actuator that can simplify the manufacturing process and that can achieve stabilization of the drive efficiency.

According to an aspect of the present disclosure, a vibration actuator is provided that includes an electro-mechanical transducer, a vibrating body fixed to the electro-mechanical transducer. The vibrating body is vibrated by applying a voltage to the electro-mechanical transducer, and a driven body that is in contact with the vibrating body in which the driven body is frictionally driven by a vibration of the vibrating body. The driven body includes a first extended portion that extends from a main body portion of the driven body towards an inside diameter side of the vibrating body, a second extended portion that extends from the first extended portion towards an outside diameter side of the vibrating body, and a contact surface provided at a tip of the second extended portion. The contact surface is configured to be in contact with the vibrating body, and the first extended portion, the second extended portion and these contact surfaces are each capable of elastically deforming in a rotational axis direction of the driven body.

Further features and aspects of the present disclosure will become apparent from the following description of numerous example embodiments with reference to the attached drawings.

DESCRIPTION OF THE EMBODIMENTS

First Example Embodiment

Figure 1:
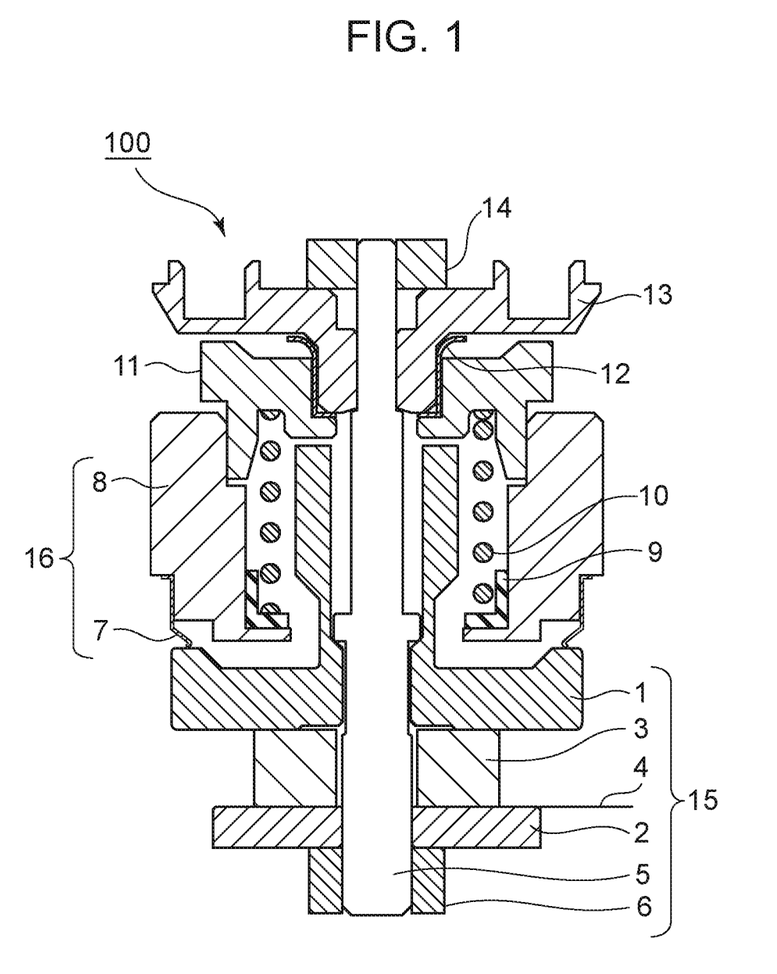
FIG. 1 is a schematic cross-sectional view of a vibration actuator according to a first example embodiment.

Referring to FIG. 1, a configuration of a vibration actuator 100 (hereinafter, referred to as an "actuator 100") of the present example embodiment will be described. FIG. 1 is a schematic cross-sectional view illustrating a configuration of the actuator 100. The actuator 100 is a rod-shaped vibration actuator that uses a rod-shaped vibrating body (a vibrator) 15.

The actuator 100 includes a piece of rubber 9, a pressure spring 10, a gear (output transmitting member) 11, a flange cap 12, a flange 13, an upper nut 14, the vibrating body 15, and a driven body (a rotor) 16. The vibrating body 15 includes a first elastic member 1, a second elastic member 2, a piezoelectric element 3 serving as an electro-mechanical transducer, a flexible printed board 4, a shaft 5, and a nut 6. The rod-shaped vibrating body 15 is configured by the first elastic member 1, the second elastic member 2, the piezoelectric element 3, and the flexible printed board 4 being tightened by the shaft 5 and the nut 6 so that a predetermined pinching force is applied thereto.

The piezoelectric element 3 includes at least two groups of electrodes (A phase electrodes and B phase electrodes) that are each formed of two electrodes. Two bending vibrations that are orthogonal to each other are excited in the vibrating body 15 when AC electric fields having different phases are applied to the group of electrodes, that is, to the A phase electrodes and the B phase electrodes, from a power supply (not shown) through the flexible printed board 4.

Figure 3:
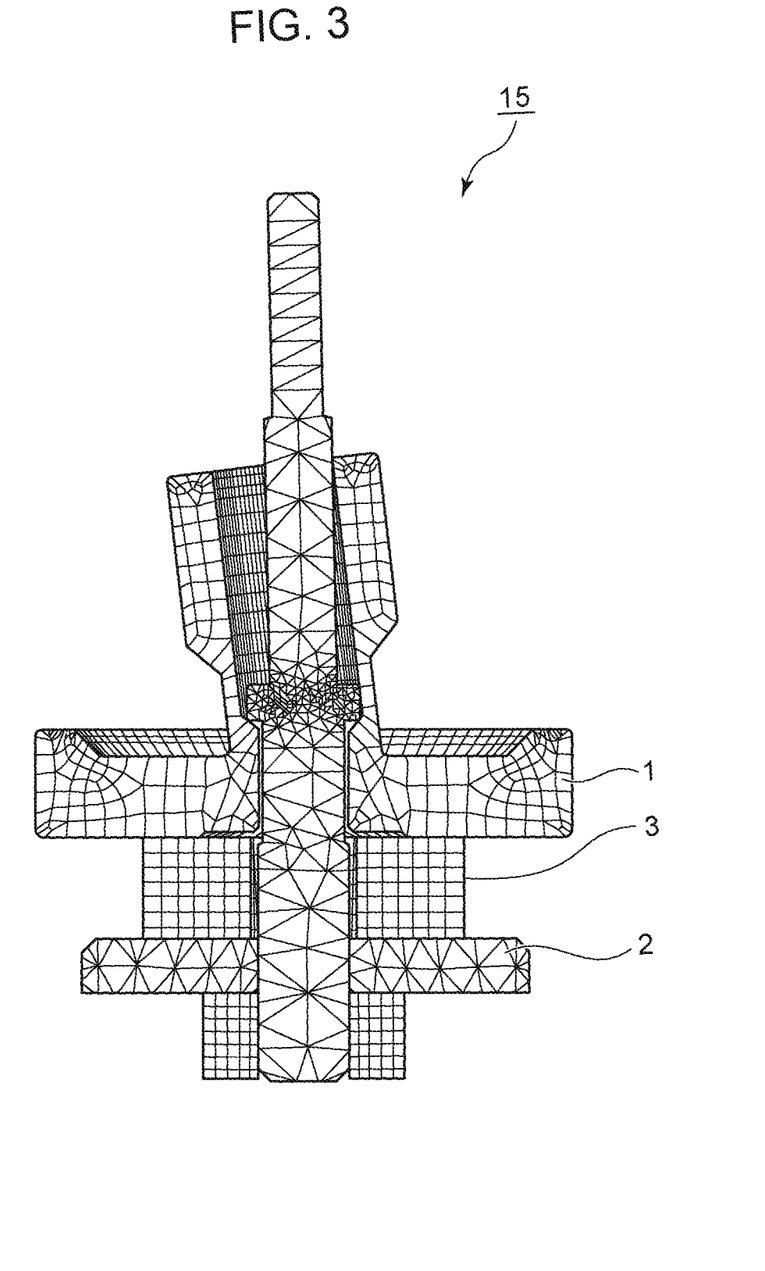
FIG. 3 is a schematic cross-sectional view illustrating a vibratory mode of a vibrating body according to the first example embodiment.

Referring to FIG. 3, the two bending vibrations excited by the vibrating body 15 will be described. FIG. 3 is a schematic diagram for describing the vibratory mode of the two bending vibrations excited by the vibrating body 15. In FIG. 3, for the sake of simplicity, the illustration of the flexible printed board 4 is omitted. It can be seen in FIG. 3 that a bending vibration that largely bends the first elastic member 1 in a relative manner is generated. Assuming that the above vibratory mode is generated when an AC electric field is applied to the A phase electrodes, then, a similar vibratory mode in a direction perpendicular to the sheet surface is generated when an AC electric field is applied to the B phase electrodes. The spacial phases of the two vibratory modes are shifted with respect to each other by 90 degrees about the axis. By controlling the phases of the applied AC electric fields, a temporal phase difference of 90 degrees can be created in the two bending vibrations and, as a result, the bending vibrations rotate the vibrating body 15 about the axis and an ellipsoidal movement is formed on the first elastic member 1.

The piezoelectric element 3 may be a laminated piezoelectric element formed by co-firing a plurality of piezoelectric layers and electrode layers that have been laminated alternately, or may be a piezoelectric element formed by laminating a plurality of piezoelectric elements and interposing elastic members therebetween.

Desirably, a sensor phase for monitoring the vibrating state of the vibrating body is provided in a portion of the A phase electrodes in the piezoelectric element 3 of the vibrating body 15. The vibrating state of the vibrating body is monitored by detecting the charge generated due to the distortion created by the bending vibrations of the vibrating body, in other words, the charge generated by a positive piezoelectric effect. In the above case, the resonance frequency generated by the input frequency is a resonance frequency generated when the phase difference between the voltage applied to the A phase electrodes and the output signal of the sensor phase is 90 degrees, and as the resonance frequency above becomes higher, the phase difference gradually shifts from 90 degrees. Accordingly, when exciting the vibration, the relationship between the input frequency and the resonance frequency of the vibrating body can be monitored by detecting the value of the phase difference, and the vibrating body can be driven in a stable manner.

The driven body (rotor) 16 includes a contact portion 7 and a rotor main ring (main body portion) 8. A surface of the contact portion 7 on the first elastic member 1 side (the surface on the lower end) is in contact with the first elastic member 1.

Pressure is applied to the rotor main ring 8 with the pressure spring 10 with the rubber 9 interposed therebetween. By having pressure applied to the rotor main ring 8 in the above manner, frictional force is created between the contact portion 7 and the first elastic member 1, and the contact portion 7 is frictionally driven and rotated with the ellipsoidal movement formed in the first elastic member 1. The contact portion 7 is fixed to the rotor main ring 8, and the contact portion 7 and the rotor main ring 8 rotate in an integral manner. Note that the rubber 9 also has a function of making the pressing force uniform.

The gear 11 is provided on a surface on the upper portion of the rotor main ring 8, and a recessed portion is formed in the upper surface of the rotor main ring 8. By having the recessed portion of the rotor main ring 8 engage with a protruded portion formed on the gear 11, the gear 11 rotates together with the rotor main ring 8 and transmits the output of the vibration actuator to an external member. Furthermore, the gear 11 sliding and rotating with respect to the flange cap 12 while receiving the reactive force of the applied pressure functions as a bearing as well.

Furthermore, the position of the shaft 5 is fixed with the flange 13 and the upper nut 14 that attach the vibration actuator. Furthermore, the flange cap 12 is press-fitted to the flange 13 to prevent wearing of the flange 13.

Figure 2:
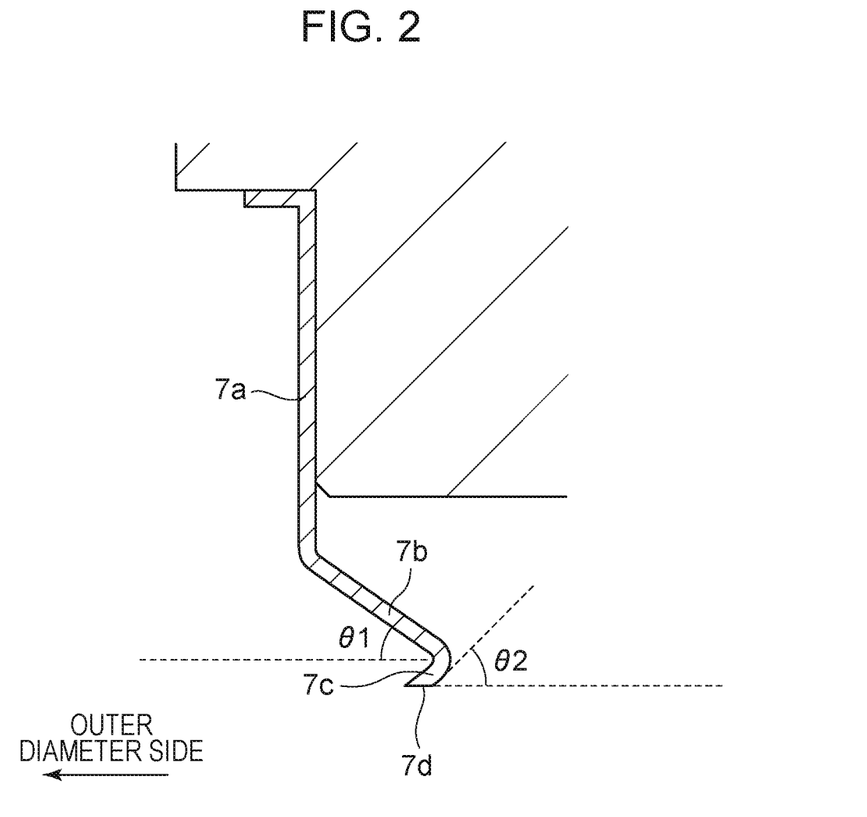
FIG. 2 is a schematic cross-sectional view of a contact surface of a movable body according to the first example embodiment.

Referring to FIG. 2, a configuration of the contact portion 7 will be described next. FIG. 2 is a schematic cross-sectional view illustrating a configuration of the contact portion 7 of the driven body 16 of the present example embodiment. The contact portion 7 includes a support portion 7a, a first extended portion 7b, a second extended portion 7c, and a contact surface 7d. The first extended portion 7b, the second extended portion 7c, and the contact surface 7d are each formed so as to be capable of elastically deforming in a rotational axis direction of the rotor 16. The contact portion 7 is structured so as to have an appropriate spring property. Furthermore, desirably, the first extended portion 7b, the second extended portion 7c, and the contact surface 7d are each capable of elastically deforming in a radial direction of the rotor 16 as well.

Moreover, desirably, the first extended portion 7b and the second extended portion 7c are formed so that the thicknesses thereof are uniform in a circumferential direction so that the displacement of the contact surface 7d in the rotational axis direction and the radial direction is uniform in the circumferential direction. Note that in the present specification, the radial direction refers to a direction perpendicular to the rotational axis direction of the rotor 16.

The support portion 7a includes a first portion that is in contact with the rotor main ring 8, and a second portion that is on the vibrating body 15 side (on a vibrating body side) with respect to the first portion and that is not in contact with the rotor main ring 8. Desirably, the second portion extends in the rotational axis direction of the driven body 16; however, the second portion does not necessarily have to extend in the rotational axis direction.

The first extended portion 7b is in contact with the rotor main ring 8 through the support portion 7a and extends towards the inside diameter side of the vibrating body 15 from the rotor main ring 8. Note that "extend from the rotor main ring 8" includes a case in which the first extended portion 7b extends from the contact portion between the rotor main ring 8 and the support portion 7a, and a case in which, as illustrated in FIG. 2, the first extended portion 7b extends from the second portion of the support portion 7a that is not in contact with the rotor main ring 8. The first extended portion 7b extends obliquely towards the inside diameter side of the vibrating body 15 and the vibrating body 15 side. The second extended portion 7c extends from the first extended portion 7b towards the outside diameter side of the vibrating body 15, and in a direction that intersects the vibrating body 15 side and the first extended portion 7b. A bend portion that is curved to change the direction in which the contact portion 7 extends is disposed between the first extended portion 7b and the second extended portion 7c. Note that while a portion that extends in the rotational axis direction of the vibrating body may be provided between the first extended portion 7b and the second extended portion 7c, it is desirable that the extending direction is changed by providing the bent portion, such as the one in the present example embodiment, to simplify the manufacturing process.

Note that in the present specification, the "inside diameter side" may be a direction orthogonal to the rotational axis direction or may be a direction that is not orthogonal to the rotational axis direction. The "inside diameter side" is an orientation that intersects the rotational axis direction and that approaches the inner side of the rotor 16 from an optional position. Furthermore, in the present specification, the "outside diameter side" may be a direction orthogonal to the rotational axis direction or may be a direction that is not orthogonal to the rotational axis direction. The "outside diameter side" is an orientation that intersects the rotational axis direction and that approaches the outer side of the rotor 16 from an optional position.

The contact surface 7d is formed at a distal end of the second extended portion 7c and is a surface that comes in contact with the vibrating body 15. The contact surface 7d is a surface that is substantially parallel to the surface of the vibrating body 15 with which the contact portion 7 comes in contact. Note that herein, "substantially parallel" does not have to be completely parallel, and may be a deviation from parallel, which is within the manufacturing error or the range that the actuator 100 permits.

Desirably, a metal material is used as the material of the contact portion 7. Specifically, stainless steel having wear resistance, strength, and corrosion resistance, or more preferably, SUS420J2 is used as the material. Furthermore, a material such as aluminum or iron may be used.

The contact portion 7 can be manufactured by a turning process, a 3D printer, or the like; however, from the view point of processing accuracy, cost, and the like, desirably, the contact portion 7 is manufactured by press working. The contact portion 7 is fixed to the rotor main ring 8 through the support portion 7a by either of the following methods: adhesion with a resin adhesive, metal brazing such as soldering, welding such as laser welding, resistance welding, or the like, and mechanical joining such as press-fitting, calking, or the like. The support portion 7a does not have to include a second portion that does not come in contact with the rotor main ring 8; however, in order to facilitate the step of fixing the contact portion 7 to the rotor main ring 8, desirably, the support portion 7a is configured so that sufficient function as a contact portion can be exerted even when the second portion is included.

Figure 4A:
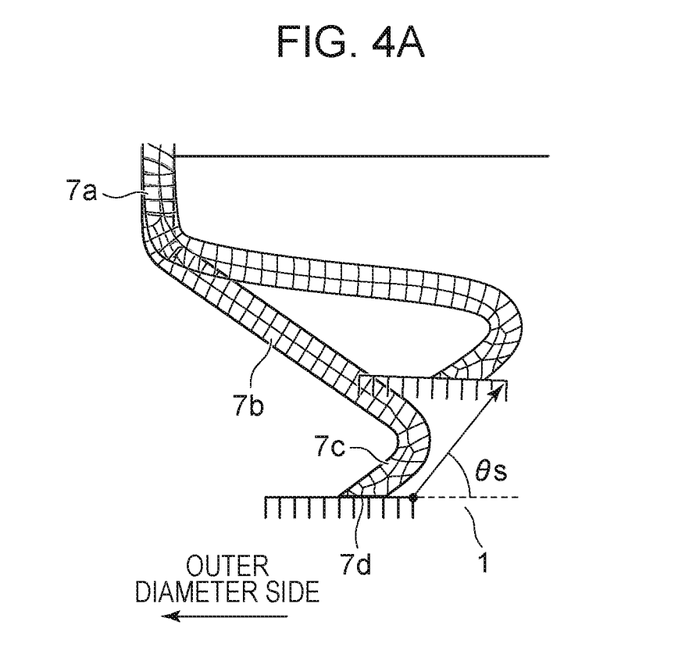
FIG. 4A is a schematic diagram illustrating a displacement f a contact portion according to the first example embodiment.
Figure 4B:
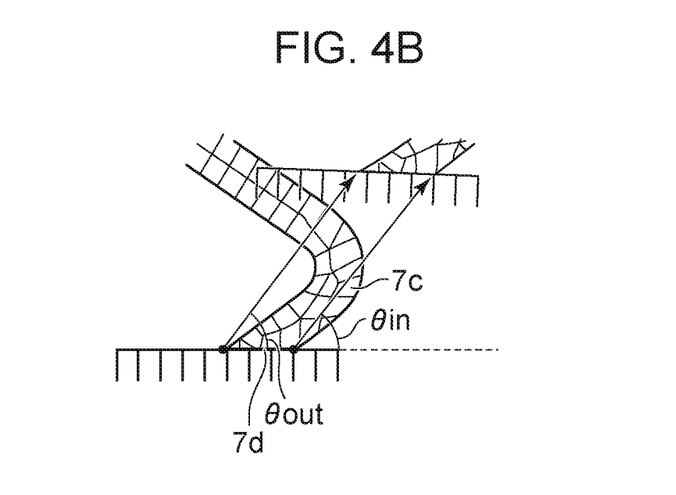
FIG. 4B is an enlarged view illustrating a displacement f a contact surface according to the first example embodiment.

Referring to FIGS. 4A and 4B, a vibrating state of the contact portion 7 when the actuator 100 is driven will be described. FIG. 4A is a schematic diagram illustrating displacement of the contact portion 7, and FIG. 4B is an enlarged view illustrating displacement of the contact surface 7d. As described above, the vibrating shape of the vibrating body 15 includes a shape illustrated in FIG. 3. Furthermore, as illustrated in FIGS. 4A and 4B, the contact surface of the vibrating body 15 in contact with the contact portion 7 vibrates in a displacement direction corresponding to the drive and vibration of the vibrating body 15. When the actuator 100 is driven, the contact portion 7 also vibrates in a certain displacement direction in accordance with the vibration of the vibrating body 15. In the description hereinafter, an angle formed between a direction of displacement of an optional position in the contact surface of the vibrating body 15 or the contact portion 7 when vibrated, and the contact surface of the vibrating body 15 is referred to as a "vibrating angle". For example, the displacement direction is a direction that is parallel to a straight line connecting an optional position in the contact surface of the vibrating body 15 before the actuator 100 is driven, and the optional position in the contact surface of the vibrating body 15 in a state in which vibration has been formed in the vibrating body 15. Furthermore, the vibrating angle of the vibrating body 15 is an angle formed between the displacement direction and the contact surface of the vibrating body 15. In the description hereinafter, the vibrating angle of the vibrating body 15 is referred to as a vibrating angle θs.

As a comparative example, a vibrating state of a conventional contact portion will be described with reference to FIGS. 7B and 7C. The conventional contact portion is designed so that a vibrating angle θout of a contact surface on an outside diameter side of a contact portion, and a vibrating angle θs of a contact surface of a vibrating body substantially coincide each other. However, with the configuration of the conventional contact portion, since the difference (θin−θout) between a vibrating angle θin of an end portion of the contact surface of the contact portion on the inside diameter side, and the vibrating angle θout of an end portion on the outside diameter side is large, when a vibration is generated, the inside diameter side becomes lifted up. Accordingly, the surface pressure concentrates on the outside diameter side, and wear of the contact portion on the outside diameter side becomes larger compared with the wear on the inside diameter side. If the above state continues, the contact portion on the outside diameter side becomes worn and, eventually, the surface of the contact portion and the surface of the vibrating body comes in full contact with each other. After the above, since there is a difference in the vibrating angle of the contact portion on the inside diameter side and that on the outside diameter side, the vibrating body and the contact surface of the contact portion greatly slide against each other and a large friction loss is created; accordingly, drive efficiency of the vibration actuator may be decreased.

Conversely, in the contact portion 7 of the present example embodiment, the difference between the vibrating angle θin of the end portion of the contact surface 7d on the inside diameter side and the vibrating angle θout of the end portion on the outside diameter side is small; accordingly, even when a vibration is generated, concentration of the surface pressure to either one of the inside diameter side and the outside diameter side can be reduced. The above occurs because the contact portion 7 includes the first extended portion 7b that extends towards the inside diameter side of the vibrating body 15, and the second extended portion 7c that extends towards the outside diameter side of the vibrating body 15. The above will be described specifically.

A case in which the contact portion includes no second extended portion 7c will be considered first. In such a case, the contact portion includes an extended portion that extends from the rotor main ring 8 towards the inside diameter side of the vibrating body 15, and a contact surface that is formed at a tip of the extended portion. In such a configuration, similar to the example of the related art, as illustrated in FIGS. 7B and 7C, in the contact portion, the vibrating angle θin of the end portion of the contact surface on the inside diameter side is larger than the vibrating angle θout of the end portion on the outside diameter side and, furthermore, the difference therebetween is large; accordingly, the external pressure is concentrated on the outside diameter side. Furthermore, a case in which the contact portion includes no first extended portion 7b will be considered. In such a case, the contact portion includes an extended portion that extends from the rotor main ring 8 towards the outside diameter side of the vibrating body 15, and a contact surface that is formed at the tip of the extended portion. In such a configuration, in the contact portion, the vibrating angle θout of the end portion of the contact surface on the outside diameter side is larger than the vibrating angle θin of the end portion on the inside diameter side and, furthermore, the difference therebetween is large; accordingly, the external pressure is concentrated on the inside diameter side. As described above, when a pressure is applied by vibration of the vibrating body 15, the behavior of the vibrating angle on the inside diameter side and that on the outside diameter side are different between the first extended portion 7b and the second extended portion 7c. In the contact portion 7 of the present example embodiment, the composition of the displacement of the first extended portion 7b and the displacement of the second extended portion 7c becomes the vibrating angle θin of the end portion of the contact surface 7d on the inside diameter side and the vibrating angle θout of the end portion on the outside diameter side. Accordingly, the difference in the vibrating angles on the inside diameter side and the outside diameter side is cancelled, and as a result, the difference between the vibrating angle θin of the end portion of the contact surface 7d an the inside diameter side and the vibrating angle θout of the end portion of the contact surface 7d on the outside diameter side can be made smaller than conventional cases.

In the above case, desirably, the extending direction of the first extended portion 7b and that of the second extended portion 7c are determined so that the vibrating angle θin of the end portion of the contact surface 7d on the inside diameter side and the vibrating angle θout of the end portion on the outside diameter side coincide with the vibrating angle θs of the vibrating body 15. Note that the vibrating angle θin and the vibrating angle θout, and the vibrating angle θs do not have to coincide each other completely, and may differ within the range that does not greatly decrease the drive efficiency, when driving the actuator 100, compared with the drive efficiency of the known art.

The vibrating angle θin of the end portion of the contact surface 7d on the inside diameter side and the vibrating angle θout of the end portion on the outside diameter side are each preferably within the range of 40 degrees and 60 degrees in order to readily match the angles to the vibrating angle θs of the vibrating body 15.

Note that the vibrating angle θin and the vibrating angle θout are, desirably, the same; however, the angles do not have to be completely the same as long as they are within a preferable range. Specifically, in order to readily match the vibrating angle θin and the vibrating angle θout of the contact surface 7d to the vibrating angle θs of the vibrating body 15, desirably, the angle difference between the vibrating angle θin and the vibrating angle θout of the contact surface 7d is 6 degrees or less. Since the vibrating angles θin and θout, and the vibrating angle θs of the vibrating body 15 can be made to substantially coincide each other, the angle difference between the vibrating angle θin and the vibrating angle θout of the contact surface 7d is more preferably 3 degrees or less. Moreover, since the vibrating body 15 itself has a difference between the vibrating angles on the inside diameter side and the outside diameter side, the differences between the vibrating angles at various positions on the contact surface 7d and the vibrating angle of the vibrating body 15 are preferably 3 degrees or less throughout the entire contact surface 7d.

Furthermore, in order to readily match the vibrating angle θs of the vibrating body 15 and the vibrating angle of the contact surface 7d to each other, desirably, the difference between an acute angle θ1 formed between the extending direction of the first extended portion 7b and the contact surface 7d, and an acute angle θ2 formed between the extending direction of the second extended portion 7c and the contact surface 7d is small. Specifically, the difference between the angle θ1 and the angle θ2 is preferably 10 degrees or less and, more preferably, is 3 degrees or less. Furthermore, in order to provide an appropriate spring property and to match the vibrating angle of the vibrating body, the angle θ1 and the angle θ2 are preferably within the range of 25 degrees to 65 degrees. In a case in which the value of the angle θ1 and that of the angle θ2 are close to each other, the difference between the thickness of the first extended portion 7b and the thickness of the second extended portion 7c is preferably 20 μm or less. However, in a case in which, due to the restriction in the pressing step, the thickness of the first extended portion 7b and the thickness of the second extended portion 7c are large, the angle θ1 and the angle θ2 can be adjusted so that the vibrating angles θin and θout coincide each other.

According to the actuator 100 of the present example embodiment, by configuring the contact portion 7 in the above described manner, concentration of the surface pressure and creation of local wearing due to the concentration, such as those in the example of the related art, can be reduced. Accordingly, since there is less sliding between the contact surface 7d and the vibrating body 15 compared with the sliding in the example of the related art, the drive efficiently of the actuator can be improved. Furthermore, since the contact state between the contact surface 7d and the vibrating body 15 does not easily change between the beginning of use and after using the actuator, the life of the actuator 100 can be elongated and a change in controllability in the course of using the actuator can be made small.

The contact portion 7 of the present example embodiment can be manufactured by press working. Furthermore, in a case in which the contact portion 7 is manufactured by press working, the contact surface 7d can be formed not with a surface of a sheet metal but by lapping the section of the sheet metal; accordingly, the contact portion 7 having a contact surface 7d with a desired flatness can be provided without taking the finished flatness of the press working into consideration. Accordingly, in the actuator 100 of the present example embodiment, compared with conventional actuators, the drive efficiency can be improved, the manufacturing process can be simplified, and the drive efficiency can be stabilized. Furthermore, since the finished flatness of the press working does not need to be taken into consideration, there is an advantage in processability.

Second Example Embodiment

Figure 5:
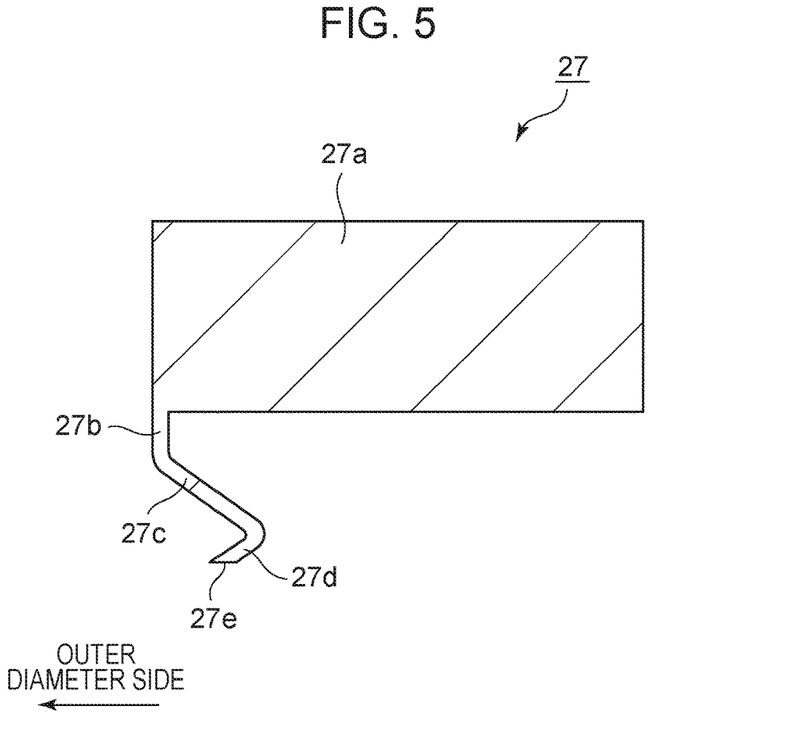
FIG. 5 is a schematic cross-sectional view of a movable body according to a second example embodiment.

The present example embodiment includes, in place of the driven body 16 of the first example embodiment, vibration actuator including a driven body (rotor) 27 in which the configuration of the contact portion is different from that of the first example embodiment. The vibration actuator will be described with reference to FIG. 5. FIG. 5 is a schematic cross-sectional view illustrating a configuration of the rotor 27 of the present example embodiment and illustrates a cross-section of the vicinity of a contact portion of the rotor 27. Note that in the description hereinafter, since the configurations other than that of the rotor 27 are the same as those of the first example embodiment, detailed descriptions thereof are omitted. In the driven body 27 of the present example embodiment, a rotor main ring (a main body portion) 27a and the contact portion are formed integrally.

The rotor 27 includes the rotor main ring (the main body portion) 27a, and a contact portion including a support portion 27b, a first extended portion 27c, a second extended portion 27d, and a contact surface 27e. The configurations of the first extended portion 27c, the second extended portion 27d, and the contact surface 27e are the same as those of the first example embodiment, and the contact surface 27e is in frictional contact with the vibrating body 15. The first extended portion 27c, the second extended portion 27d, and the contact surface 27e are each configured so as to be capable of being elastically deformed in the rotational axis direction.

The rotor 27 of the present example embodiment can be manufactured by cutting a metal material with a lathe into the rotor main ring 27a and the contact portion. Accordingly, the configuration of the present example embodiment does not need the step of binding the contact portion and the rotor main ring to each other. Furthermore, since the rotor 27 can be manufactured by cutting, when the manufacturing number of the vibration actuator is small, the manufacturing cost can be reduced compared with press working.

Similar to the first example embodiment, desirably, a metal material is used as the material of the rotor 27. The specific material that is used includes a metal material such as, for example, an aluminum alloy or stainless steel. When an aluminum alloy that has satisfactory cuttability is used as the material of the rotor 27, desirably, the wear resistance thereof is increased by treatment, such as hard anodized aluminum treatment. When stainless steel is used as the material of the rotor 27, desirably, martensitic stainless steel, such as SUS420J2, capable of increasing the hardness thereof by being quenched after the processing is used.

Accordingly, as described from the description above, the present example embodiment is capable of simplifying the manufacturing process and stabilizing the drive efficiency.

Third Example Embodiment

In a third example embodiment, an imaging apparatus that is an example of an electronic device including the vibration actuator described above will be described with reference to FIG. 6, FIG. 6 is a perspective view illustrating a schematic structure of a digital camera 101 that is an example of the imaging apparatus.

Figure 6:
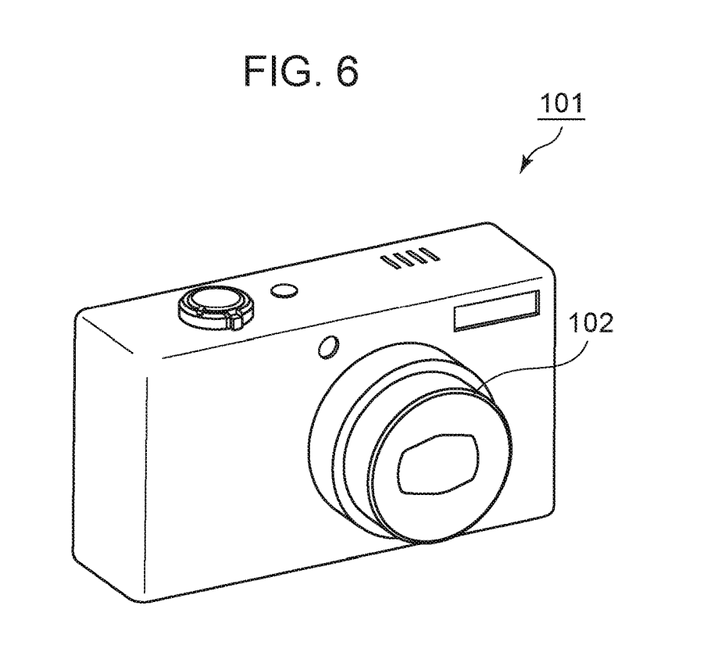
FIG. 6 is a perspective view of an imaging apparatus according to a third example embodiment.

A lens barrel 102 is attached to a front side of the digital camera 101, and a group of lenses (not shown) capable of moving in an optical axis direction is disposed inside the lens barrel 102. The vibration actuator 100 of the first example embodiment are connected to the group of lenses disposed in the lens barrel 102 through a gear train (not shown) and drives the group of lenses of the lens barrel by driving the actuator 100 with a driving method described in the first example embodiment. For example, the actuator 100 can be used optionally to drive a zoom lens and/or a focusing lens.

While numerous example embodiments of the present disclosure have been described above, the present disclosure is not limited to the various embodiments and may be deformed and modified within the scope of the gist of the disclosure. Furthermore, within the above scope of the gist, the configurations of the example embodiments described above may be combined.

For example, in the third example embodiment described above, the actuator 100 of the first example embodiment is used as the driver; however, not limited to the above, the vibration actuator of the second example embodiment may be used.

Furthermore, in the example embodiments described above, an example of a rod-shaped vibration actuator including a rod-shaped vibrating body 15 has been described; however, the present disclosure can be also applied to a ring-type vibration actuator including a ring-type vibrating body. A configuration of the ring-type vibration actuator is described in detail in U.S. Pat. No. 9,154,056. As a specific example, the support portion 7a of the contact portion 7 of the first example embodiment may come in contact with a main body portion of a movable body of the ring-type vibration actuator, and the contact portion 7 may be fixed to a main body portion 3a. In such a case, the contact surface 7d of the contact portion 7 comes in contact with the vibrating body of the ring-type vibration actuator, and through the contact surface 7d, the movable body serving as a driven body is driven by a progressive vibration wave formed in the vibrating body.

While the present invention has been described with reference to numerous example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-087516 filed Apr. 26, 2017, which is hereby incorporated by reference herein in its entirety.

What is claimed is:

1. A vibration actuator comprising:
   an electro-mechanical transducer;
   a vibrating body fixed to the electro-mechanical transducer, wherein the vibrating body is vibrated by applying a voltage to the electro-mechanical transducer; and
   a driven body that is in contact with the vibrating body, wherein the driven body is frictionally driven by a vibration of the vibrating body, wherein the driven body includes a first extended portion that extends from a main body portion of the driven body towards an inside diameter side of the vibrating body, a second extended portion that extends from the first extended portion towards an outside diameter side of the vibrating body, and a contact surface that is in contact with the vibrating body and is provided at a tip of the second extended portion, and wherein the first extended portion, the second extended portion, and the contact surface are each capable of elastically deforming in a rotational axis direction of the driven body, wherein an angle $\theta1$ of an acute angle formed between the first extended portion and the contact surface is within a range of 25 degrees to 65 degrees.

2. The vibration actuator according to claim 1, wherein a bend portion is provided between the first extended portion and the second extended portion.

3. The vibration actuator according to claim 1, wherein the driven body includes a support portion through which the first extended portion is connected to the main body portion and that extends in the rotational axis direction from the main body portion of the driven body.

4. The vibration actuator according to claim 3, wherein the support portion includes a first portion that is in contact with the main body portion, and a second portion that extends on a vibrating body side with respect to the first portion.

5. The vibration actuator according to claim 1, wherein an angle $\theta2$ of an acute angle formed between the second extended portion and the contact surface is within the range of 25 degrees to 65 degrees.

6. The vibration actuator according to claim 5, wherein an angle difference between the angle $\theta1$ and the angle $\theta2$ is 10 degrees or less.

7. The vibration actuator according to claim 5, wherein an angle difference between the angle $\theta1$ and the angle $\theta2$ is 3 degrees or less.

8. A vibration actuator comprising:
an electro-mechanical transducer;
a vibrating body fixed to the electro-mechanical transducer, wherein the vibrating body is vibrated by applying a voltage to the electro-mechanical transducer; and
a driven body that is in contact with the vibrating body, wherein the driven body is frictionally driven by a vibration of the vibrating body, wherein the driven body includes a first extended portion that extends from a main body portion of the driven body towards an inside diameter side of the vibrating body, a second extended portion that extends from the first extended portion towards an outside diameter side of the vibrating body, and a contact surface that is in contact with the vibrating body and is provided at a tip of the second extended portion, and wherein the first extended portion, the second extended portion, and the contact surface are each capable of elastically deforming in a rotational axis direction of the driven body, wherein, in a section including the rotational axis direction, an angle $\theta in$ of an acute angle formed by a straight line connecting an end portion of a contact surface on an inside diameter side in a state in which a vibration is not generated, and the end portion of the contact surface on the inside diameter side in a state in which the vibrating body is applying pressure to the contact surface with the vibration of the vibrating body, and a surface with which the contact surface of the vibrating body is in contact is within a range of 40 degrees to 60 degrees.

9. The vibration actuator according to claim 8, wherein in a section including the rotational axis direction, an angle $\theta out$ of an acute angle formed by a straight line connecting an end portion of a contact surface on an outside diameter side in a state in which a vibration is not generated, and the end portion of the contact surface on the outside diameter side in a state in which the vibrating body is applying pressure to the contact surface with the vibration of the vibrating body, and a surface with which the contact surface of the vibrating body is in contact is within a range of 40 degrees to 60 degrees.

10. The vibration actuator according to claim 9, wherein a difference between the angle $\theta in$ and the angle $\theta out$ is 6 degrees or less.

11. The vibration actuator according to claim 9, wherein a difference between the angle $\theta in$ and the angle $\theta out$ is 3 degrees or less.

* * * * *